May 19, 1942. V. M. HENKELL 2,283,886
RECIPROCATING ELECTRIC MOTOR
Filed Aug. 10, 1939 2 Sheets-Sheet 1
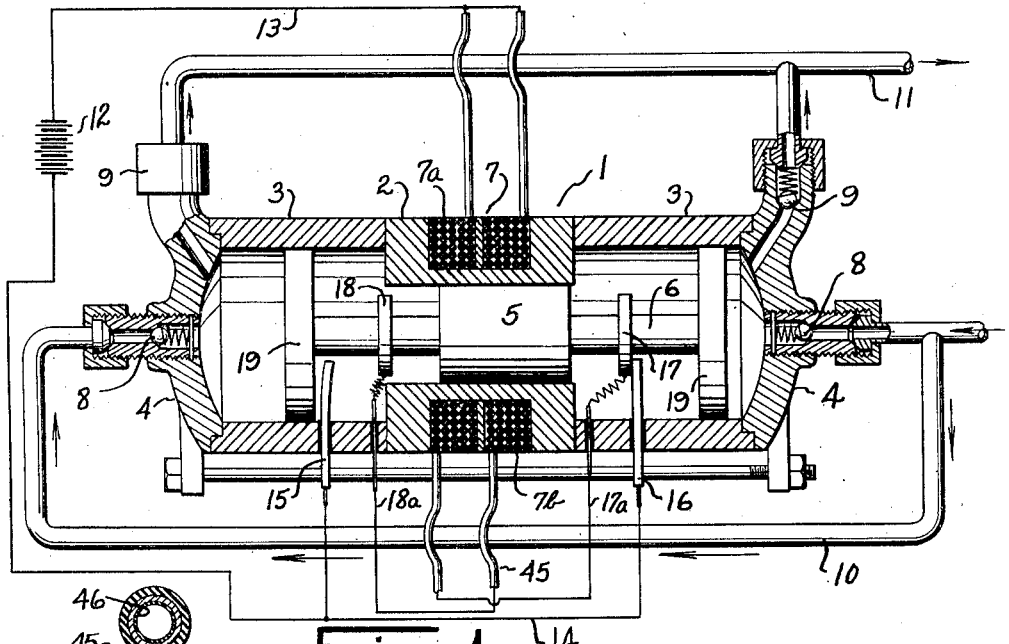
Fig. 1.
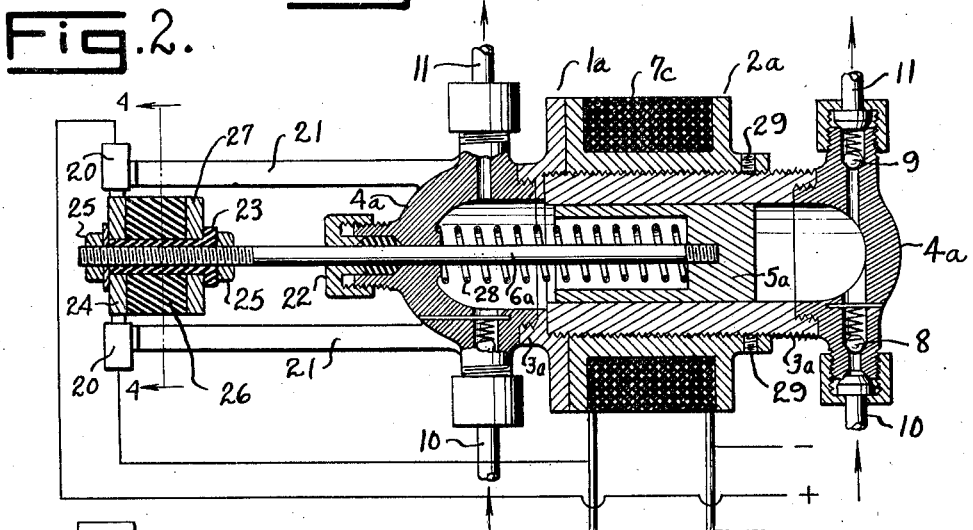
Fig. 2.
Fig. 3.
Fig. 4.
Inventor
VICTOR M. HENKELL
By E. V. Hardway
Attorney Inventor
VICTOR M. HENKELL Patented May 19, 1942

2,283,886

UNITED STATES PATENT OFFICE 2,283,886

RECIPROCATING ELECTRIC MOTOR

Victor M. Henkell, Houston, Tex., assignor of one-half to William H. H. Osterday, Harris County, Tex.

Application August 10, 1939, Serial No. 289,338

7 Claims. (Cl. 172—126)

This invention relates to a reciprocating electric motor.

An object of the invention is to provide an electric motor having a reciprocating armature, which is more particularly adapted to be used as a motive power for a pump.

Another object of the invention is to provide an electric motor in which current to the field winding is controlled by contacts which are momentarily connected when the armature is in its position of maximum stroke.

It is a further object of the invention to provide a pump and reciprocating electric motor inclosed in a single housing to thereby form a compact pumping unit.

Another object of the invention is to provide an electric motor having a field winding formed of tubing through which a fluid may be circulated to thereby provide cooling means for the motor and further to provide heat for raising the temperature of the fluid flowing through the tubing, which temperature rise will be advantageous when the pump is used in a refrigerating system.

With the above and other objects in view, the invention has particular relation to certain novel features of construction, operation and arrangement of parts, an example of which is given in this specification and illustrated in the accompanying drawings, wherein:

Figure 1 shows a vertical sectional view of the apparatus.

Figure 2 shows a sectional view of the winding of the field coil.

Figure 3 shows a vertical sectional view of another form of the apparatus.

Figure 4 shows a longitudinal sectional view taken along the line 4—4 of Figure 3.

Figure 5:
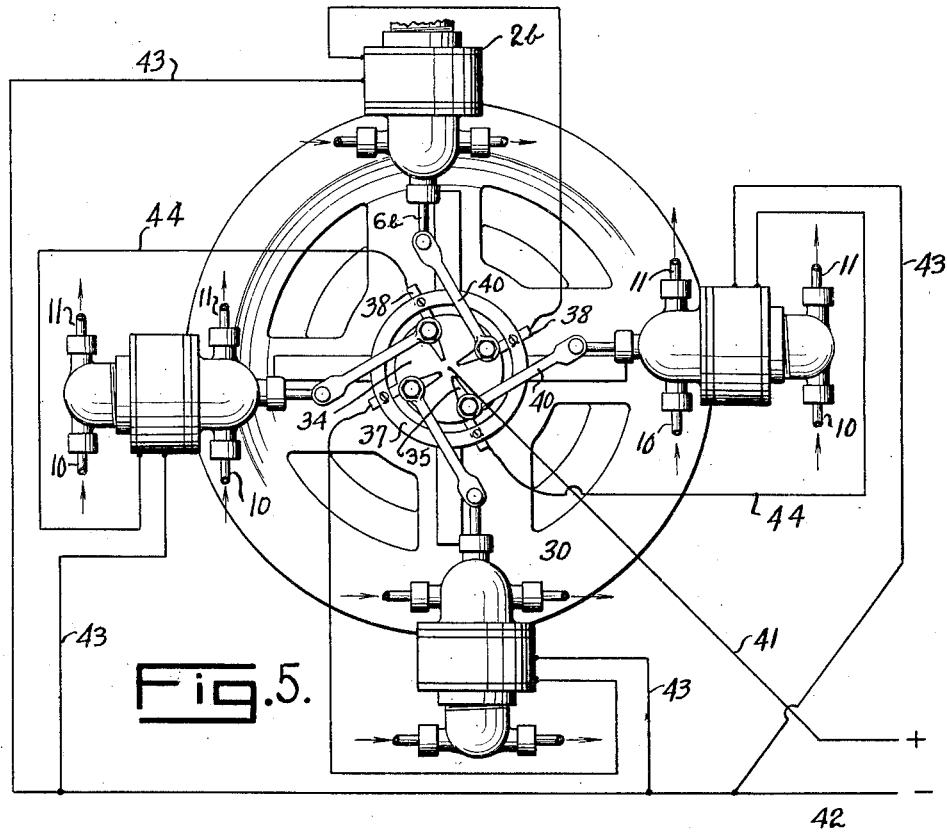
Figure 5 shows a plan view of another form of the invention.

Referring now more particularly to the drawings wherein like numerals of reference designate the same parts in each of the figures, the numeral 1 designates the housing of the pumping unit as a whole which comprises a core 2 of any suitable material, pump chambers formed of walls 3, 3 of non-magnetic material and heads 4, 4 closing the chambers and constructed of a magnetic metal. Reciprocably mounted in the housing is a motor armature 5 with the piston rod 6 attached thereto. Wound in a recess in the core 2 is a suitable coil forming a solenoid or field 7. The armature 5 is positioned so that its center of gravity is eccentric to the field of the solenoid forming field coils when the pump is at the end of its stroke. Each of the heads 4, 4 has a suitable inlet valve 8 and outlet valve 9 to which is connected an inlet conduit 10 and an outlet conduit 11 respectively.

A suitable supply of electricity, preferably low voltage direct current as from a battery or a rectifying unit is used to supply energy for driving the pump. Then if a power plant of a community fails or the electrical service is interrupted, a battery may be substituted for a rectifying unit to supply electrical energy to the motor. In the form shown in Figure 1, the battery, or rectifying unit 12, is connected to the field 7 of the motor through the leads 13 and 14, the lead 13 being connected to one side of the separate fields 7a and 7b. The other lead 14 being connected to the contact posts 15 and 16 which extend into the housing and are insulated therefrom. The other ends of the field solenoids 7a and 7b are connected to contact rings 17 and 18 respectively, by suitable connections which are insulated from the housing and have flexible links therein so that the rings may be reciprocated without breaking the electrical connection, which rings are mounted on the pump rod. The rings are suitably insulated from the pump rod and each will touch its corresponding contact post when the armature 5 is at the end of its stroke.

As shown in Figure 1, contact ring 17 is touching the contact post 16. This completes the circuit through the field 7a, lead 13, battery 12 and back through the lead 14 to the contact post 16, thus energizing the field 7a and causing a flow of the magnetic flux. When this contact is made, the center of gravity of the armature is offset from the center of the iron core 2 so that the magnetic flux will draw the armature into the core. Due to the reluctance and magnetic properties of the iron core, the core will remain magnetized for a slight period of time after the connection between the ring 17 and contact post 16 is broken. The armature, due to its momentum, will travel through the core until contact ring 18 makes an electrical connection with contact post 15, which connection will energize the field 7b and cause the armature to reverse its direction. In order to facilitate stopping and reversal of the direction of the armature, the heads 4, 4 are preferably constructed of magnetic material such as soft iron, so that stray flux from the iron core will be concentrated in the head and thereby add to the force exerted on the armature. The pistons 19, 19 which reciprocate in the pump chambers should also be partially formed of magnetic material so that the flux which is concentrated in the heads 4, 4 is more effective to assist in moving the armature and pistons.

In the form shown in Figure 3, the electrical contacts are external to the housing 1a, being formed of contact posts 20, 20 which are supported by and insulated from suitable arms 21, 21 which extend longitudinally outward from the motor housing. The piston rod 6a is extended through the head of the motor and is threaded on said extended end, and there is a packing gland 22, between the rod and the head. A switch plunger is mounted on the threaded portion of the rod which consists of an insulating sleeve 23, contact plates 24 and 27 mounted on the sleeve and nuts 25, 25 connecting the sleeve to the rod. Also mounted on the sleeve is an insulating cylinder 26 which is maintained on the sleeve by the plates 24 and 27. The contact plate 24 is adapted to complete an electrical connection between the contact posts 20, 20. The field 7c is connected to a supply of electrical energy through the contact posts 20, 20 so that current is delivered to the field solenoid when the armature 5a is in the position shown. It can be seen that the center of gravity of the armature is offset from the magnetic center of the core so that the armature is drawn into the core 2a by the flux emitted from the field. Then, after the center of gravity of the armature has passed the center of the field 7c, contact plate 27 will electrically connect the contact posts 20, 20 so that the field solenoid will be again energized to draw the armature into the core 2a and move the piston rod 6a and contact plate 24 toward the contact posts 20, 20 to thus start a new cycle of operation. The switch plunger is adjustable along the piston rod 6a by rotating the nuts 25, 25, so that the armature, field and switch plunger may be correctly positioned with respect to each other. The spring 28 is under compression when the contact plate 24 is away from the contact posts 20, 20 so that the armature is partially returned by the spring 28 and partially by the magnetic pull of the field to position shown in Figure 3 so that electrical contact will again be established between the post 20 by the contact plate 24 to complete the circuit through the field 7c to thereby move the armature. The core 2a is threaded on the pump chamber wall 3a so that it is axially adjustable and is held in desired adjustment by suitable set screws 29, 29. The armature 5a also acts as a piston and will pump fluid at both ends of the housing in the conventional manner. The heads 4a, 4a are of magnetic material for the purpose hereinbefore stated.

Figures 6, 7:
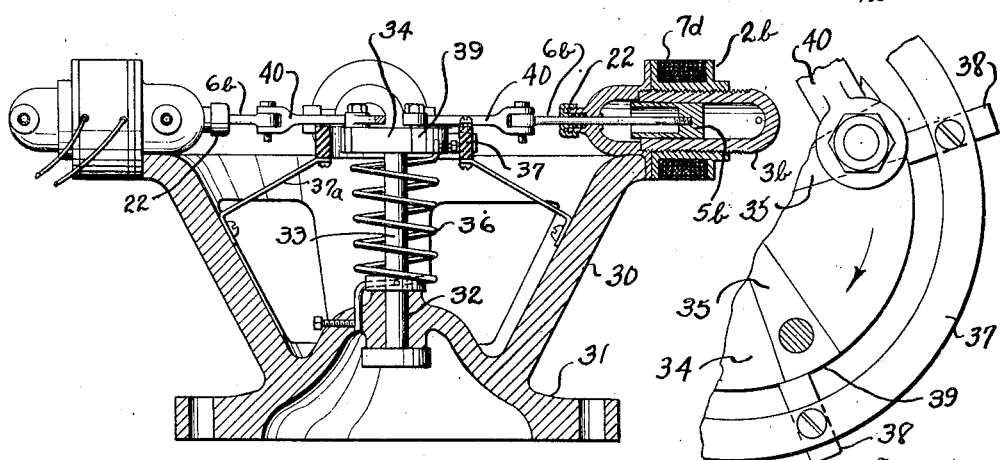
Figure 6 shows a vertical sectional view of the form shown in Figure 5.
Figure 7 shows a fragmentary plan view of the commutator embodied in the form shown in Figures 5 and 6.

The form of the apparatus shown in Figures 5 and 6 operates similarly to the type shown in Figure 3 hereinbefore described as the field 7d of each motor actuates the armature 5b in one direction and a torsion spring aids to return each armature to initial position. More particularly, this form comprises an upwardly and outwardly diverging stand 30 and a base plate 31 having holes therein by which the base plate may be attached to a supporting framework. The center of the base has a vertical bearing 32 into which is rotatably mounted a commutator shaft 33. On the upper end of the switch shaft is mounted a switch comprising a switch disc 34 of electrical conducting material and having segments 35, 35 of insulating material inset therein. A torsion spring 36 is positioned around the shaft 33 having one end connected to the base 30 and the other end connected to the switch disc 34, the spring 36 thereby resisting rotation of the disc. Positioned around the switch disc, and supported from the frame 30 by brackets 37a, is a ring 37 of insulating material forming a support for the brushes 38, 38 which are narrower than the width of the peripheral faces 39, 39 of the insulating wedges 35.

There are several individual motors mounted on the upper margin of the stand 30, each motor comprising an armature 5b forming a piston and a piston rod 6b extending through one end of the motor with a packing gland 22 between the rod and the head. Each extended rod is connected to a corresponding insulating segment 35 by means of pivotally connected links 40, 40. Each motor is mounted so that the piston rods 6b are each displaced slightly from the center line of the switch shaft 33, and the links 40, 40 are at an angle with the pump rods 6b, 6b, so that the switch disc 34 is rotated when the armature 5b, 5b and piston rods 6b, 6b are reciprocated.

A suitable source of low voltage direct current is connected to the leads 41, 42, the lead 41 terminating at the switch disc 34. The fields 7d, 7d of the motors are connected in parallel with one terminal of each connected to the lead 42 by electrical conductors 43, 43, the other terminal of the field being connected to the respective brushes 38, 38, by means of electrical conductors, 44, 44. In neutral or starting position, the brushes will be substantially seated on the peripheral faces 39 of the insulating segments 35, and slightly overlapping the same to make electrical contact with the disc 34 when in the position shown in Figures 5, 6 and 7. When this electrical contact is made, each of the individual fields 7d of the motors will be energized through the circuit hereinbefore described and the armatures will be pulled radially inwardly towards the switch disc 34 rotating the same against the influence of the torsion spring 36 and breaking the electrical contact between the brushes 38, 38 and disc 34. The momentum of the moving parts will carry the disc around so that the brushes 38 will contact the disc 34 on the opposite side of the insulating segment 35. When this contact is made, the fields 7d, 7d of the motors will be energized to pull the armatures 5b, 5b radially outwardly as the armatures will have passed through the center of the fields to thereby start a new cycle of operation. The torsion spring 36 will aid the fields 7d, 7d to return the armatures to original position, and also prevent the motor from stopping with the brushes resting totally on the faces of the insulated segments. The cores 2b, 2b are longitudinally adjustable along the piston walls 3b, 3b. It is contemplated that the stroke of the motors be very short and that the armatures be reciprocated at a high frequency in each of the forms herein disclosed, however, if it is so desired, the insulating segments may be widened so that the stroke is longer. The armature 5b will also act as a pump piston and operate similar to the manner in which the form shown in Figure 3 operates.

Another embodiment of the invention is to construct the field coil 7 of an insulated tubular conductor 45 as shown in the cross section of the windings disclosed in Figure 2. A cooling medium may be circulated through the tubular windings 45 to thereby reduce the temperature windings and core to reduce the losses caused by electrical and magnetic resistance which resistance rises with the rise in temperature. The cooling medium may be non-conducting, or the inner surface of the tubes may be insulated by a coating of shellac or other insulating material 46. If the pump is used in a refrigerating system, the refrigerant may be partially heated in the tubular windings so that a greater temperature difference in the refrigerating system is obtained to thereby give a greater refrigerating effect for a given system.

The drawings and description disclose what is believed to be preferred forms of the invention, by way of illustration only, while the broad principle of the invention will be defined by the appended claims.

What I claim is:

1. A reciprocating electric motor comprising a housing, a single field winding around the housing, an armature reciprocable in the housing, means including a shaft and a disc thereon connected to the armature for momentarily applying electric current to the field winding of the motor when the armature is eccentric to the magnetic axis of the field winding at both ends of the stroke of the armature to thereby create a magnetic field effective to move the armature upon application of said electric current.

2. A reciprocating electric motor comprising a core, an armature reciprocable in the core, a single field winding around the core, means controlling the flow of electrical current adapted to allow the electricity to flow through the field when the center of gravity of the armature is eccentric to the center of a magnetic field induced by the field winding and core, at both ends of the stroke of the armature, so that the armature is drawn toward the field winding, actuating means adapted to actuate the controlling means to interrupt the flow of current through the field upon movement of the armature toward the field said actuating means including a shaft, means connecting the armature to the shaft for actuating the shaft in one direction and yieldable means for actuating the shaft in the other direction.

3. A reciprocating electric motor comprising a housing, an armature in the housing, a field winding around the housing, an extended rod connected to the armature, a switch member attached to the end of said extended rod, brushes associated with the switch member, said switch member being formed of insulating and electrically conducting materials arranged to electrically connect said brushes solely when the armature is at the end of its stroke to thereby control the flow of electric current to the field winding so that said winding is momentarily energized, when the armature is at the end of its stroke, to create a magnetic field effective to move the armature, yieldable means effective to break said electrical connection with the brushes.

4. Apparatus of the character described comprising a set of electric motors, an oscillatory switch, each of said motors comprising a housing, a field winding, an armature reciprocable in the housing, oscillating links connecting said switch to the armatures of each motor, yieldable member acting in opposition to the influence of the armature, said switch being adapted to control the flow of current to the respective motor field windings so that the windings are intermittently energized to thereby reciprocate the armatures in the respective housings.

5. Apparatus of the character described comprising a set of electric motors, each of said motors comprising a housing, a field winding, an armature reciprocable in the housing, a switch mechanically connected to said armatures to be actuated thereby, in one direction, mechanical means for actuating the switch in the other direction, said switch being formed of insulating and electrically conducting materials, said field windings being electrically connected to a source of electrical energy through said switch, the materials of said switch being arranged to allow the flow of electricity to the field windings and to momentarily interrupt said flow solely when the armatures are at a predetermined position.

6. Apparatus of the character described comprising a set of electrical motors, an oscillatory switch, each of said motors comprisig a housing, a field winding, an armature, oscillatory links connecting said switch to the armatures of each motor, for actuating the switch in one direction, mechanical means for actuating the switch in the other direction, said switch being formed of insulating and electrically conducting materials and connecting the motor field windings with a source of electrical energy during the majority of the stroke of said armature and to momentarily disconnect said source of electricity from the fields solely when the armatures are at a predetermined position.

7. Apparatus of the character described comprising a set of electric motors; each of said motors comprising a housing, a field winding about the housing and an armature reciprocable in the housing; a rotatably mounted disc formed of electrical conducting material and having a plurality of inserts therein formed of insulating material; a brush holder formed of insulating material; brushes formed of conducting material mounted on the holder; electrical conductors leading from the brushes through the field windings and connected into a source of electrical energy; an electrical conductor leading from said source to said disc; oscillatory links connected at one end with said armatures and at their other ends to said respective disc inserts; said brushes and discs being relatively positioned so that the brushes will contact alternately with the disc and the corresponding inserts as the disc oscillates, and a yieldable member arranged to be rendered active when the disc is rotated in one direction by the armatures and effective to return the armatures to original position with the switches in contact with the disc and with the corresponding inserts.

VICTOR M. HENKELL.